United States Patent

[11] 3,550,800

| [72] | Inventor | W E Robinson |
| | | Rte. 1, Box 116G, Haughton, La. 71037 |
| [21] | Appl. No. | 784,003 |
| [22] | Filed | Dec. 16, 1968 |
| [45] | Patented | Dec. 29, 1970 |

[54] BOAT CARRIER AND LAUNCHER FOR PICKUP TRUCKS
12 Claims, 11 Drawing Figs.

| [52] | U.S. Cl. | 214/450 |
| [51] | Int. Cl. | B60r 9/08 |
| [50] | Field of Search | 214/450, 85.1, 85.5; 224/42L.M. |

[56] References Cited
UNITED STATES PATENTS

| 2,586,485 | 2/1952 | Schroeder | 214/85.5X |
| 3,170,583 | 2/1965 | Meyer | 214/450 |
| 3,343,696 | 9/1967 | Morrison | 214/450 |
| 3,411,644 | 11/1968 | Cook | 214/450 |

*Primary Examiner*—Hugo O. Schulz
*Attorney*—Clarence A. O'Brien & Harvey B. Jacobson

ABSTRACT: A rearwardly and downwardly inclined elongated guideway for support from the load bed of a pickup truck and having an elongated boat cradle removably guidingly engaged therewith for movement therealong and including rear ground engageable support wheels for support of the rear end of the cradle from the ground as the cradle is shifted rearwardly of the guideway. The cradle includes boat hull support means whereby a partially floating boat hull may be advanced longitudinally toward the cradle and supported therefrom and the pickup truck-mounted guideway structure includes winch means whereby the cradle, with a boat supported therefrom, may be winched into its forward and uppermost position on the guideway.

PATENTED DEC 29 1970

W. E. Robinson
INVENTOR.

BY *Clarence A. O'Brien*
and *Harvey B. Jacobson*
Attorneys

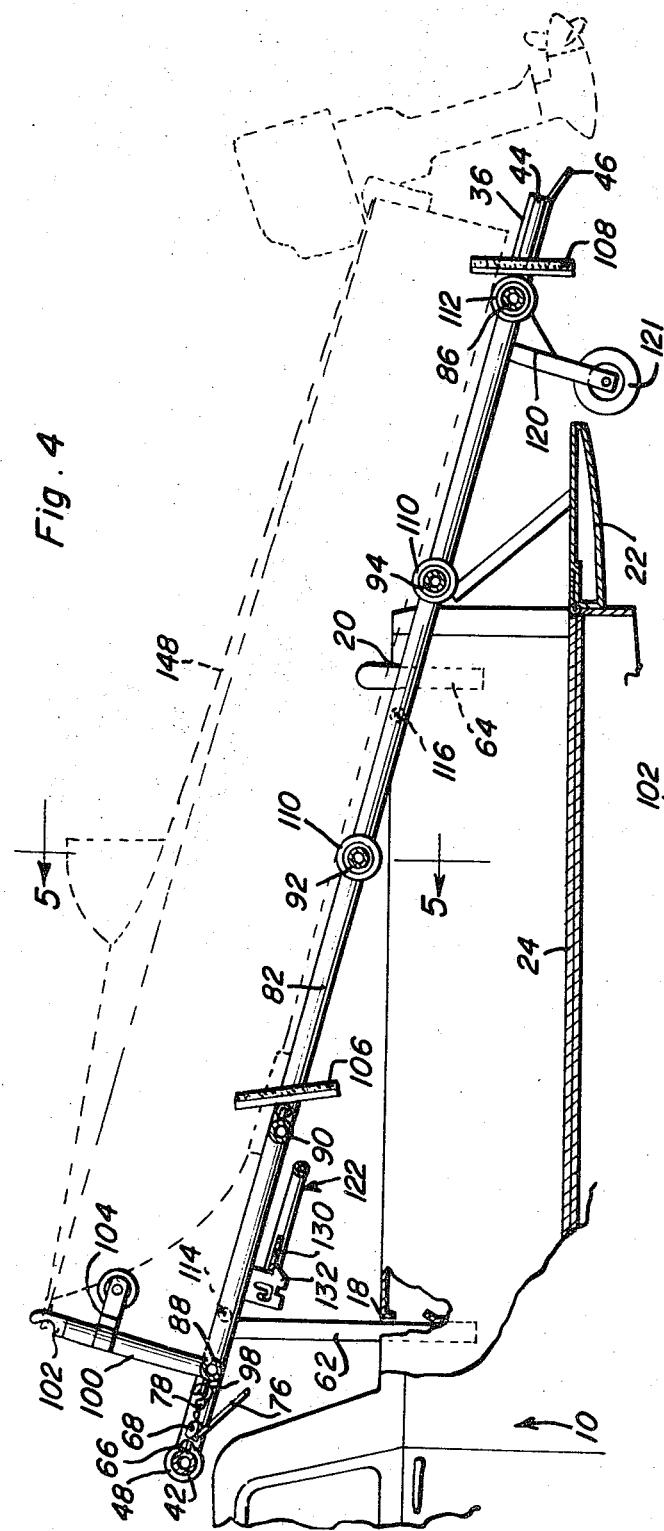
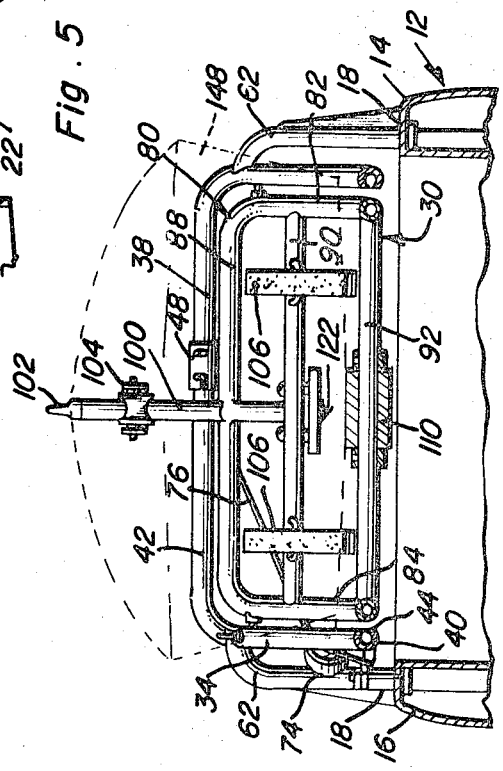
W E Robinson
INVENTOR.

W E Robinson
INVENTOR.

BY Clarence A. O'Brien
and Hervey B. Jacobson
Attorneys

BOAT CARRIER AND LAUNCHER FOR PICKUP TRUCKS

The boat carrier or transport of the instant invention may be utilized on and supported from the rear end portion of substantially any land vehicle. However, it has been specifically designed for use on pickup trucks and includes mounting structures operable to a coact with and be removably telescoped in the upwardly opening sockets provided in the sidewalls of load beds of most conventional pickup trucks for removable support of the boat carrier or transport from a desired pickup truck.

Many sportsman own pickup trucks which they have purchased for one or more of several reasons which may include the necessity of owning a pickup truck in performance of their man main occupation, their own personal desire to own a utility vehicle for various ancillary reasons or to enable them to more readily travel over unimproved roads and through wooded areas in pursuit of perhaps several different sporting activities throughout each year. Pick Pickup trucks may of course be purchased with heavy duty rear springs for carrying heavy loads and the inherent increased ground clearance of a pickup truck makes it selection as a vehicle in support of numerous outdoor sporting activities very common.

Inasmuch as many sportsmen engaging in various sporting activities throughout the year do own pickup trucks and a large percentage of sportsmen engage in sporting activities during the warmer months in which a boat is used, the main object of this invention is to provide an assemblage which may be readily attached to and removed from a pickup truck and utilized to support a boat on an associated pickup truck.

Another object of this invention, in accordance with the immediately preceding object, is to provide an assemblage including structural features thereof enabling a boat supported on an associated pickup truck to be readily launched therefrom directly into the water and retrieved from the water and again loaded on the associated pickup truck with little effort.

Still another object of this invention is to provide an assemblage in accordance with the preceding objects including a boat-cradling portion upon which a boat may be loaded and supported from a guide structure that may be removably supported from a pickup truck with the boat-cradling structure shiftable longitudinally of the guide structure and endwise disengageable therefrom whereby a boat supported from the cradling structure may be shifted longitudinally of the guide structure from a position supported on the associated pickup truck and launched into an adjacent body of water.

A further object of this invention, in accordance with the immediately preceding object, is to provide a boat-cradling structure with depending rear ground-engaging support wheel means for support of the rear end of the cradling structure as it is shifted rearwardly relative to the associated pickup truck and from engagement with the guide structure mounted on the pickup truck.

Still another object of this invention is to provide a boat-cradling assemblage in accordance with the immediately preceding object and including a retractable forward landing gear structure whereby the cradle assembly with an associated boat supported therefrom may be disengaged from the pickup truck mounted guide and support structure therefor for support of the boat-cradling structure from the ground.

A final object of this invention to be specifically enumerated herein to is to provide an assemblage in accordance with the preceding objects which will conform to conventional forms of manufacture, be of simple construction, easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an enlarged fragmentary elevational view of the rear portion of FIG. 1 but with portions of the pickup truck broken away and other portions of the pickup truck and the boat-carrying assemblage of the instant invention illustrated in longitudinal vertical section;

FIG. 5 is a fragmentary transverse vertical sectional view taken substantially upon the plane indicated by section line 5-5 of FIG. 4;

Figure 10:
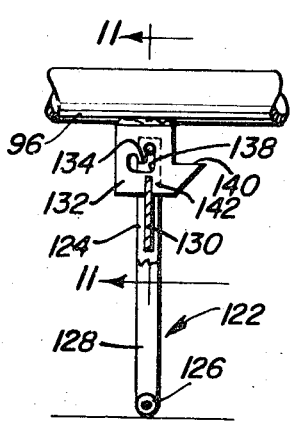
Figure 8:
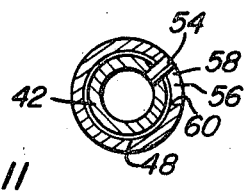
FIG. 8 is a vertical sectional view taken substantially upon the plane indicated by the section line 8-8 of FIG. 7.
Figure 9:
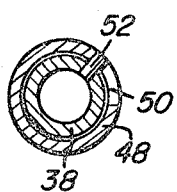
FIG. 9 is a vertical sectional view taken substantially upon a plane indicated by the section line 9-9 of FIG. 7.
Figure 11:
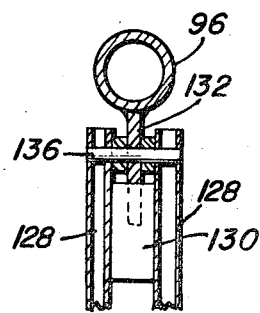

FIG. 10 is a fragmentary enlarged side elevational view of the center longitudinal member at the forward end of the boat cradle portion of the instant invention illustrating its retractable landing gear structure with portions of the landing gear structure being broken away and illustrated in longitudinal vertical section; and FIG. 11 is a fragmentary vertical sectional view taken substantially upon the plane indicated by section line 11-11 of FIG. 10.

Referring now more specifically to the drawings, the numeral 10 generally designates a conventional form of pickup truck including a rear load bed assembly referred to in general by the reference numeral 12 and including a pair of upstanding opposite sidewalls 14 and 16. Each of the sidewalls 14 includes a pair of front and rear upwardly opening sockets 18 and 20 which are conventionally utilized to mount side extensions on the side walls 14 and 16. The load bed assembly 12 further includes a conventional rear tail gate assembly 22 and a flooring 24 extending between the lower marginal edge portions of the sidewalls 14 and 16.

The boat carrier and launcher or transport assembly is referred to in general by the reference numeral 26 and includes an elongated guide structure referred to in general by the reference numeral 28 and a boat cradle assembly referred to in general by the numeral reference numeral 30.

Figure 7:
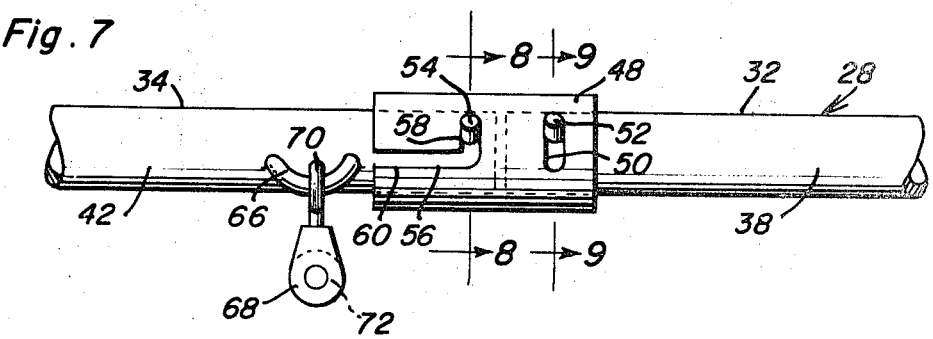
FIG. 7 is a rear elevational view of the forward crossmember of the guide structure portion of the instant invention illustrating the manner in which the opposite side portions thereof are removable removably coupled together.

The guide structure includes a pair of generally horizontally disposed L-shaped guide members 32 and 34. The guide member 32 includes a long leg 36 and a short leg 38 while the guide member 34 includes a long leg 40 and a short leg 42. The guide members 32 and 34 are generally identical except that they are right and left-handed and the adjacent ends of the short legs 38 and 42 thereof includes slightly different structural features to be hereinafter more fully set forth. Each of the long legs 36 and 40 is tubular in configuration and includes an inner side longitudinally extending slot 44 which open through the rear end of the corresponding long leg. In addition, each long leg 36 and 40 includes a rearwardly and downwardly inclined extension or guide 46. The short legs 38 and 42 of the guide members 32 and 34 project inwardly from the forward ends of the long leg 36 and the short leg 38 includes a sleeve-coupling member 48 having one end portion telescoped and rotatably received over the free end of the short leg 38. The sleeve-coupling member 48 includes a circumferentially extending slot 50 and the short leg 38 includes a radially extending pin 52 by which the rotary oscillation of the sleeve-coupling member 48 on the free terminal end of the short leg 38 is limited. In contrast, the free end of the short leg 42 is provided with a radially outwardly projecting pin 54 and the end of the sleeve-coupling member 48 remote from the end thereof in which the slot 50 is formed includes an L-shaped slot 56 including a circumferentially extending short leg 58 terminating at one end in a longitudinally extending long leg 60 which opens through the corresponding end of the sleeve-coupling member 48. As may be seen from FIG. 7 of the drawings the sleeve-coupling member 48 removably couples the short legs 38 and 42 together against axial separation and the sleeve member 48 may be rotated approximately 45° in a counterclockwise direction as viewed from the left in FIG. 7 of the drawings in order to register the inner end of the long leg 60 of the slot 56 with the pin 54 in order that the short leg 42 may be axially separated from the short leg 38.

Each of the long legs 36 and 40 includes a pair of front and rear inverted J-shaped members 62 and 64 and the lower ends of these J-shaped members are downwardly removably seatable in the sockets 18 and 20 for support of each side of the guide structure from the corresponding sidewalls of the load bed assembly 12.

The guide structure 28 also includes an anchor ring 66 on the free end portion of the short leg 42 of the guide member 34 and a pulley block 68 has its eye portion 70 engaged with the anchor ring 66 and includes a journaled pulley wheel 72. In addition, a winch assembly referred to in general by the reference numeral 74 is mounted on a lower portion of the forward inverted J-shaped member 62 carried by the long leg 40 of the guide member 34 and one end of an elongated flexible tension member 76 is partially wound on the winding drum portion (not shown) of the winch assembly 74 while the other end of the tension member 76 is threaded through the pulley block 68 and trained about the pulley wheel 72. The free terminal end of the tension mm member 76 has a hook 78 supported therefrom for a purpose to be hereinafter more fully set forth.

The boat-cradling assembly 30 includes a generally rectangular frame referred to in general by the reference numeral 80 and including a pair of opposite side longitudinal members 82 and 84 interconnected at their rear ends by means of a rear transverse member 86 and including an integral forward transverse member 88 extending between the forward ends of the longitudinal members 82 and 84. Supplemental transverse members 90, 92 and 94 also extend between the longitudinal members 82 and 84 at points spaced longitudinally therealong and a short longitudinal member 96 extends between the center of the forward transverse member 88 and the supplemental transverse member 90. Further, the forward transverse member 88 includes an anchor eye 98 and an upstanding bow stop 100 including a hook 102 at its upper end and a bow stop element or fixture 104 centrally intermediate its upper and lower ends and which project rearwardly of the bow stop 100.

The supplemental transverse member 90 includes a pair of opposite side boat supporting bunks 106 which are pivotally supported therefrom and the rear transverse member includes a similar pair of pivoted bunks 108. Further, the supplemental transverse members 92 and 94 include center rollers 110 while the rear transverse member includes a center roller 112.

The longitudinal members 82 and 84 include outwardly projecting stub axle portions 114 upon which rollers 116 are journaled and when the boat cradle assembly 30 is supported from the guide structure 28 the rollers 116 are rollingly received within the long legs 36 and 40 of the guide members 32 and 34. The extensions or guides 46 carried by the rear ends of the long legs 36 and 40 are operable to engage the rollers 116 when the boat-cradling cradling assembly 30 is being pulled forwardly toward the rear end of the guide structure 28 and to guide the rollers 116 into the long legs 36 and 40 of the guide members 32 and 34.

The rear end of the boat-cradling assembly 30 includes a pair of depending support legs 120 supported at their upper ends from the rear ends of the longitudinal members 82 and 84 and which have ground-engaging support wheels 121 journaled from their lower ends. Also, the longitudinal member 96 of the boat-cradling assembly 30 includes a retractable landing gear assembly referred to in general by the reference numeral 124 and including a pivoted support leg 124 having a transversely extending foot member 126 supported from its free end for engagement with the ground. The support leg 124 comprises a pair of parallel leg elements 128 interconnected at one pair of corresponding ends by means of a web 130 secured therebetween and the upper ends of the leg elements 128 are pivotally secured to a depending mounting plate 132 supported from the longitudinal member 96 by means of a pin and slo connection 134 including a pin 136 extending between the leg elements 128 and shiftable in a slot 138 formed in the mounting plate 132. The mounting plate 132 includes surface portions thereof defining first and second notches 140 and 142 with which the web 130 is engageable to releasably secure the landing gear assembly 122 in the retracted and extended positions, respectively.

The long leg 40 of the guide member 34 includes a pair of longitudinally spaced vertical bores 144 and a pair of pins 146 removably receivable in the bores 144 rearward of the corresponding stub axle portions 114 and rollers 116 so as to retain the boat-cradling assembly 30 in the forward position thereof illustrated in FIG. 4 of the drawings.

In operation, the boat carrier and launcher 26 may be assembled on the pickup truck 10 by first removably coupling the free ends of the short legs 38 and 42 together with the sleeve member 48. Then, the assembled guide structure may be lifted over the load bed assembly 12 of the pickup truck 10 and lowered downwardly toward the latter so as to engage the lower ends of the inverted J-shaped members 62 and 64 with the sockets 18 and 20. Thereafter, the boat cradle assembly 30 may be supported from the guide structure 28 by forwardly advancing the forward end of the boat cradle assembly 30 toward the rear end of the guide structure 28 so as to insert the rollers 116 in the rear ends of the long legs 36. Of course, if a boat such as boat 148 is positioned on the boat cradle assembly 30, it will be necessary to back the pickup truck 10 toward the forward end of the boat cradle assembly 30 and to then winch the latter onto the guide structure 28 by engaging the hook 78 with the anchor 98 and operating the winch assembly 74. After the boat cradle assembly 30 has been fully mounted on the guide structure 28, the pins 46 may be inserted into the bores 44 rearward of the corresponding stub axle portion 114 so as to lock the board boat cradle assembly 30 on the guide structure 28.

Figure 1:
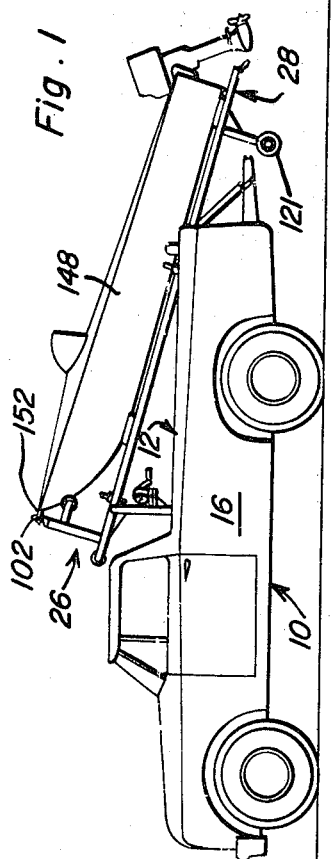
FIG. 1 is a side elevational view of a conventional form of pickup truck with the boat-carrying and launching assembly of the instant invention operatively supported from the pickup truck and a conventional form of outboard runabout supported on the assembly.
Figure 2:
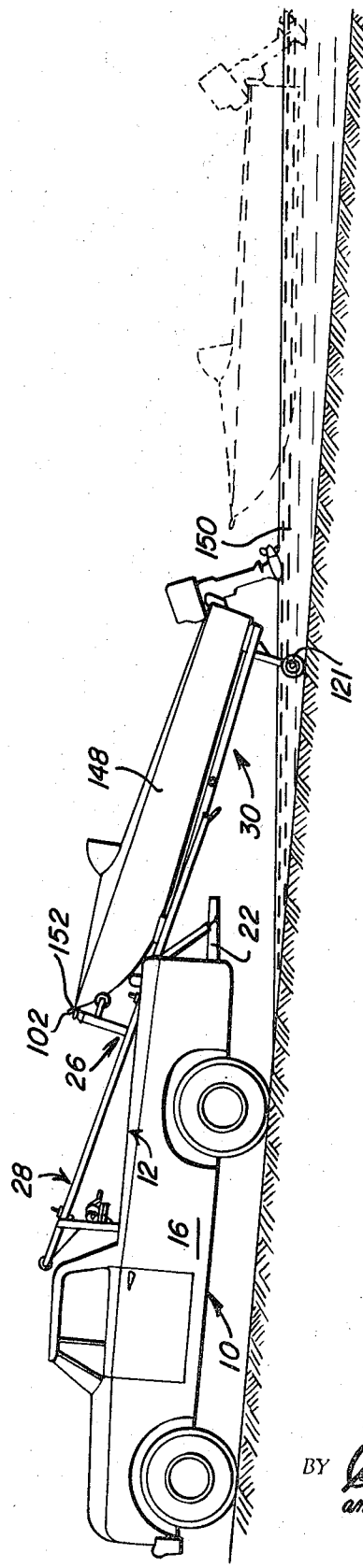
FIG. 2 is a side elevational view similar to FIG. 1 but with the assembly in operation launching the outboard runabout into a body of water.

Then, when it is desired to launch the boat 140, the pickup truck 10 may be backed downwardly toward the body 150 of water into which the boat 148 is to be launched. Thereafter, the pins 146 may be removed and the winch assembly 74 may be utilized to control the sliding movement of the boat cradle assembly 30 downwardly along the guide structure 28 to a position such as that illustrated in FIG. 2 of the drawings with the rear end of the boat 50 either immediately above the body 150 of water or actually contacting the body 150. If it is desired, rearward movement of the boat cradle assembly downwardly along the guide structure 28 may be limited by reinsertion of the rear pin 146 in the rear bore 144 after the corresponding rear stub axle portion 114 has passed rearward of the last-mentioned bore. Thus, the rear stop pin 146 will then form a stop for the forward corresponding stub axle portion 114 and roller 116. As soon as the boat 148 has been positioned as illustrated in FIG. 2 of the drawings, the bow of the boat 148 may be lifted so as to disengage the bow eye 152 from engagement with the hook 102 whereby the boat 148 will slide downwardly along the bunks 106 and 108 and into the body 150 of water. Of course, the rear end of the boat cradle assembly 30 is supported by the ground-engaging support wheels 122.

From the foregoing, it is believed do obvious that the retrieval of the boat 148 may be readily accomplished. However, if the boat cradle assembly 30 is not fully disposed in the water when it is desired to retrieve the boat 148, the rear pin 146 may be removed so as to slightly pass thereby the forward corresponding stub axle portion 114 after which the rear pin 146 may be reinserted. This of course will prevent forward movement of the boat cradle assembly 30 upwardly along the guide structure 28. Thereafter the hooks 78 may be engaged with the eye 152 on the bow of the boat 148 and the winch assembly 74 may be utilized to pull the boat 148 upwardly onto to the boat cradle assembly 30. Thereafter, the rear pin 146 may be removed and the winch assembly 74 may be further actuated to then pull both the boat 148 and the boat cradle assembly 30 up onto the guide structure 28 after which the pins 146 may be reinserted and the hook 78 may be engaged with the anchor eye 98.

Figure 3:
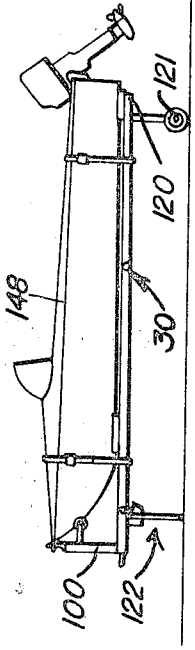
FIG. 3 is a side elevational view of the boat-cradling portion of the instant invention illustrating the manner in which it may be utilized to support an associated outboard runabout directly from the ground.
Figure 6:
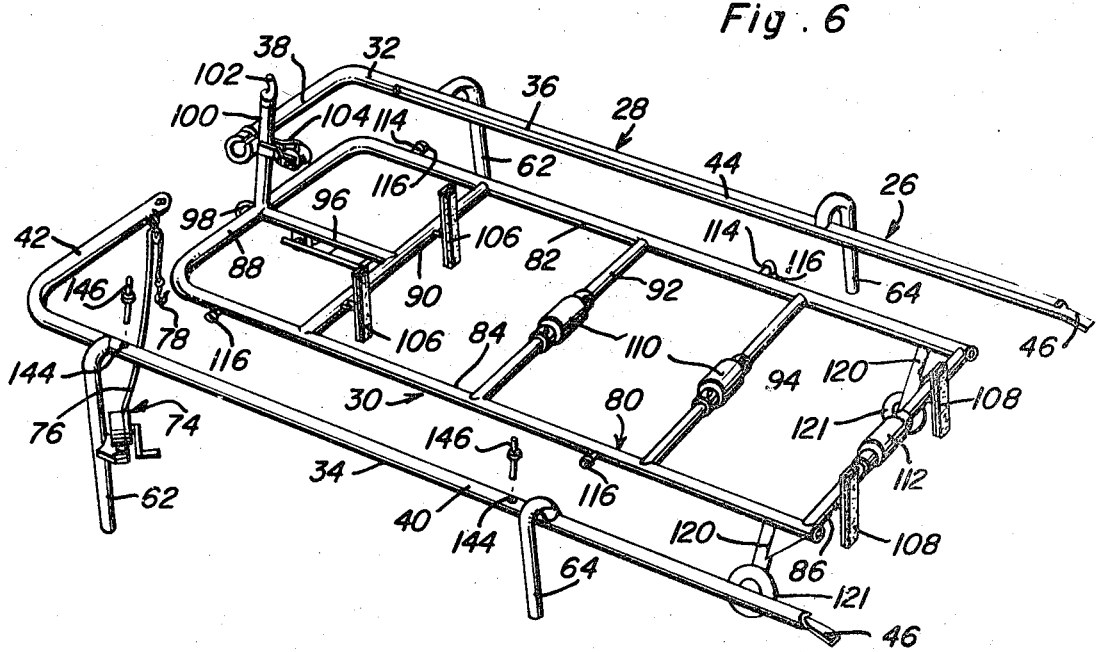
FIG. 6 is an exploded perspective view of the boat-carrying and launching assembly of the instant invention.

If it is desired to unload the boat cradle assembly 30 and the boat 148 from the guide structure 28 for the purpose of supporting the boat from the cradle assembly 30 above the ground in the manner illustrated in FIG. 3 of the drawings, the boat cradle assembly 30 is shifted rearwardly relative to the guide structure 28 in the same manner in which it is shifted during launching into the body 150 of the water. However, before the forward end of the boat cradle assembly 30 becomes disengaged from the guide structure 28, the landing assembly 122 is pivoted from the retracted horizontal position such as that illustrated in FIGS. 4 and 6 of the drawings to the depending position thereof as illustrated in FIGS. 3 and 10 of the drawings whereupon the forward end of the boat cradle assembly 30 will be supported from the ground as the assembly 30 becomes disengaged from the guide structure 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination, a land vehicle including a rear portion adapted to support a load thereon, an elongated guide structure supported on said rear portion in rearwardly and downwardly inclined position, an elongated load cradle supported from said guide structure for longitudinal shifting relative thereto, said cradle including front and rear follower means guidingly engaged with said guide structure, at least the rear follower means being endwise disengageable from the rear of said guide structure and the front follower means of said cradle, when said rear follower means is displaced rearwardly of said guide structure, defining a pivot connection between said cradle and said guide structure for oscillation of the former relative to the latter about a horizontal transverse axis adjacent said front follower means, said cradle, when only the front follower means are engaged with said guide structure, being swingable relative to said guide structure between first and second portions with the rear end of said guide structure disposed above and below said cradle, respectively.

2. The combination of claim 1 wherein the rear end of said cradle includes depending landing wheel means engageable with the ground upon rearward displacement of said cradle means relative to said guide structure past the position of initial disengagement of said rear follower means from the rear of said guide structure.

3. The combination of claim 1 wherein the rear end of said cradle includes depending landing wheel means engageable with the ground upon rearward displacement of said cradle means relative to said guide structure past the position of initial disengagement of said rear follower means from the rear of said guide structure, said front follower means also be being rearwardly disengageable from said guide structure the forward end of said cradle including a retractable front landing gear assembly.

4. The combination of claim 1 including means carried by the forward end of said cradle adapted to have the forward end of a boat hull disposed upon said cradle secured thereto.

5. The combination of claim 1 wherein said vehicle comprises a pickup truck and said rear portion comprises a load bed supported on the pickup truck.

6. The combination of claim 5 wherein said pickup truck load bed includes opposite sides each including upwardly opening sockets, said guide structure including opposite side front and rear leg portions downwardly seated in and supported from said sockets.

7. The combination of claim 6 wherein said guide structure includes opposite side portions removably joined together at their forward ends.

8. A loading and carrying apparatus for trucks comprising an elongated guide structure for support from the rear end portion of a truck in rearwardly and downwardly inclined position, said guide structure including a pair of laterally spaced and longitudinally extending guide members including front and rear ends and defining elongated channels opening toward each other and rearwardly at their rear ends, an elongated load supporting cradle including front and rear ends and elongated longitudinal opposite side members, each of said side members including longitudinally spaced front and rear follower members disposed and guidingly supported in said channels for support of said cradle from and longitudinal shifting of the latter along the guide members, said follower members being endwise disengageable from the rear lower ends of said guide members and the rear end portion of said cradle including means adapted to engage and be supported from a support surface.

9. The combination of claim 8 including means connected between said guide structure and said boat cradle operative to shift said cradle upwardly along said guide structure.

10. The combination of claim 8 wherein said guide members, rearward of their forward ends, define a vertical passage therebetween free of obstructions, said cradle, when only the front follower members thereof are engaged in said channels, being freely swingable relative to said guide structure about an axis extending between the front follower members.

11. The combination of claim 8 wherein said guide members, rearward of their front end portions, are free of connections extending therebetween, and transverse brace means extending between and removably connecting the front end portion of said guide members together.

12. The combination of claim 11 wherein said transverse brace means comprises laterally inwardly directed transverse members carried by the forward end portions of said guide members and removably joined together at their adjacent inner ends.